United States Patent
Shah et al.

(10) Patent No.: US 11,418,418 B2
(45) Date of Patent: Aug. 16, 2022

(54) PSEUDOWIRE AND LABEL SWITCHED PATH GROUPING TO ACHIEVE SCALE IN PROTECTION SWITCHING

(71) Applicant: Ciena Corporation, Hanover, MD (US)

(72) Inventors: Himanshu Shah, Hopkinton, MA (US); Jayant Kumar Bhardwaj, New Delhi (IN)

(73) Assignee: Ciena Corporation, Hanover, MD (US)

( * ) Notice: Subject to any disclaimer, the term of this patent is extended or adjusted under 35 U.S.C. 154(b) by 399 days.

(21) Appl. No.: 16/449,503

(22) Filed: Jun. 24, 2019

(65) Prior Publication Data

US 2020/0358681 A1    Nov. 12, 2020

(30) Foreign Application Priority Data

May 10, 2019  (IN) .............................. 201917018738

(51) Int. Cl.
*H04L 43/0811* (2022.01)
*H04L 41/0654* (2022.01)
*H04L 45/00* (2022.01)
*H04L 45/50* (2022.01)

(52) U.S. Cl.
CPC ...... *H04L 43/0811* (2013.01); *H04L 41/0654* (2013.01); *H04L 45/507* (2013.01); *H04L 45/68* (2013.01)

(58) Field of Classification Search
None
See application file for complete search history.

(56) References Cited

U.S. PATENT DOCUMENTS

| | | | |
|---|---|---|---|
| 7,668,105 B1 * | 2/2010 | Zimmerman | H04L 43/50 370/241 |
| 8,259,590 B2 | 9/2012 | Shah et al. | |
| 8,295,278 B2 | 10/2012 | Shah et al. | |
| 9,485,175 B2 | 11/2016 | Abdul et al. | |
| 2008/0247324 A1 * | 10/2008 | Nadeau | H04L 45/02 370/245 |
| 2009/0010171 A1 * | 1/2009 | Gupta | H04L 41/0631 370/244 |
| 2010/0023632 A1 * | 1/2010 | Liu | H04L 45/02 709/230 |
| 2012/0147737 A1 * | 6/2012 | Taylor | H04L 41/08 370/219 |
| 2013/0259057 A1 * | 10/2013 | Dutta | H04L 45/68 370/401 |
| 2015/0188814 A1 * | 7/2015 | Jain | H04L 45/50 370/392 |

\* cited by examiner

*Primary Examiner* — Mohamed Ibrahim
(74) *Attorney, Agent, or Firm* — Clements Bernard Baratta; Lawrence A. Baratta, Jr.; Christopher L. Bernard

(57) ABSTRACT

A network element includes a plurality of ports interconnected by a switching fabric, wherein a port includes a plurality of connections including an infrastructure connection that operates a Bidirectional Forwarding Detection (BFD) session and a group of connections that share a similar fate for a fault as the infrastructure connection; and a controller configured to detect a fault on the infrastructure connection via the BFD session, and cause a protection switch for one or more of the group of connections based on the fault on the infrastructure connection. The infrastructure connection and the group of connections can be Pseudowires (PWE) or Label Switched Paths (LSPs) in a Multiprotocol Label Switching (MPLS) network.

20 Claims, 8 Drawing Sheets

PSEUDOWIRE AND LABEL SWITCHED PATH GROUPING TO ACHIEVE SCALE IN PROTECTION SWITCHING

FIELD OF THE DISCLOSURE

The present disclosure generally relates to protection switching in networking. More particularly, the present disclosure relates to systems and methods for Pseudowire (PWE) and Label Switched Path (LSP) grouping to achieve scale in protection switching.

BACKGROUND OF THE DISCLOSURE

Bidirectional Forwarding Detection (BFD) is a widely used framework in Multiprotocol Label Switching (MPLS) networks to detect faults. BFD is described in RFC 5880, "Bidirectional Forwarding Detection (BFD)," June 2010; RFC 5885, "Bidirectional Forwarding Detection (BFD) for the Pseudowire Virtual Circuit Connectivity Verification (VCCV)," June 2010; and RFC 5884, "Bidirectional Forwarding Detection (BFD) for MPLS Label Switched Paths (LSPs)," June 2010; the contents of each are incorporated by reference herein. A BFD session is created on an LSP or PWE to detect any fault on that LSP or PWE. BFD is useful in MPLS network since it can detect failure of data plane within a few milliseconds. In order to detect failure, BFD packets are exchanged at a fast rate which in turn mandates processing of such packets be handled in specialized logic present in hardware. Such hardware resources are expensive and in short supply, especially on smaller, inexpensive platforms. The alternative for such platforms is to handle fast rate BFD packet processing in a processor with high priority and fast thread in software.

The dilemma of using limited hardware resources or high priority threads in software is the BFD session scale. A very small number of BFD sessions can be supported with fast fault detection. There is a requirement to support fast fault detection for at least the number of LSPs and PWs that a platform is capable of supporting.

Commonly-assigned U.S. Pat. No. 9,485,175, issued Nov. 1, 2016, and entitled "Continuity check protocol optimization systems and methods," the contents of which are incorporated by reference herein, describes one approach where a primary connection consumes hardware resources for fast fault detection while a corresponding backup connection can run low-grade monitoring handled by software. After a switchover, the backup connection can start consuming hardware resources for fast fault detection. This reduces resources on a one-to-one basis, i.e., reducing resources for one backup connection for each primary connection. As connections scale, there can be hundreds or thousands of LSPs or PWEs. There is a need for even more optimization of resources to support such scale.

BRIEF SUMMARY OF THE DISCLOSURE

In an embodiment, a network element includes a plurality of ports interconnected by a switching fabric, wherein a port includes a plurality of connections including an infrastructure connection that operates a Bidirectional Forwarding Detection (BFD) session and a group of connections that share a similar fate for a fault as the infrastructure connection; and a controller configured to detect a fault on the infrastructure connection via the BFD session, and cause a protection switch for one or more of the group of connections based on the fault on the infrastructure connection. The infrastructure connection and the group of connections can be Pseudowires (PWE). The infrastructure connection and the group of connections can be Multi-Segment Pseudowires (MS-PW) operated over a plurality of protected tunnels, and wherein the fault is on one segment. The infrastructure connection and the group of connections can be Label Switched Paths (LSPs) in a Multiprotocol Label Switching (MPLS) network. The BFD session can be only operational on the infrastructure connection on behalf of the group of connections. Service traffic can be only operational on the group of connections and the infrastructure connection is used only for establishment and operation of the BFD session. The controller can be configured to cause the protection switch by propagating the detected fault on the infrastructure connection to each connection in the group of connections. The controller can be configured to detect a clearance of the fault on the infrastructure connection and propagate the clearance to each connection in the group of connections.

In another embodiment, a method includes, in a network element having a plurality of ports, operating an infrastructure connection over a port connected to a network with the infrastructure connection having a Bidirectional Forwarding Detection (BFD) session; operating a group of connections that share a similar fate in the network for a fault as the infrastructure connection; detecting a fault on the infrastructure connection via the BFD session; and causing a protection switch for one or more of the group of connections based on the fault on the infrastructure connection. The infrastructure connection and the group of connections can be Pseudowires (PWE). The infrastructure connection and the group of connections can be Multi-Segment Pseudowires (MS-PW) operated over a plurality of protected tunnels, and wherein the fault is on one segment. The infrastructure connection and the group of connections can be Label Switched Paths (LSPs) in a Multiprotocol Label Switching (MPLS) network. The BFD session can be only operational on the infrastructure connection on behalf of the group of connections. Service traffic can be only operational on the group of connections and the infrastructure connection is used only for establishment and operation of the BFD session. The method can further include causing the protection switch by propagating the detected fault on the infrastructure connection to each connection in the group of connections. The method can further include detecting a clearance of the fault on the infrastructure connection and propagate the clearance to each connection in the group of connections.

In a further embodiment, a non-transitory computer-readable medium with instructions executable by a network element that, in response to such execution, cause the network element to perform the steps of operating an infrastructure connection over a port connected to a network with the infrastructure connection having a Bidirectional Forwarding Detection (BFD) session; operating a group of connections that share a similar fate in the network for a fault as the infrastructure connection; detecting a fault on the infrastructure connection via the BFD session; and causing a protection switch for one or more of the group of connections based on the fault on the infrastructure connection. The infrastructure connection and the group of connections can be Pseudowires (PWE). The infrastructure connection and the group of connections can be Label Switched Paths (LSPs) in a Multiprotocol Label Switching (MPLS) network. The BFD session can be only operational on the infrastructure connection on behalf of the group of connections.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

The present disclosure relates to systems and methods for Pseudowire (PWE) and Label Switched Path (LSP) grouping to achieve scale in protection switching. Specifically, the present disclosure allows large scale LSPs and PWEs to be protected by a single BFD session. This reduces the load and processing of overhead and control traffic on the network since now single BFD session can cater for multiple LSPs or PWEs. Further, the present disclosure can be efficiently adopted on existing MPLS configurations by simply creating Infra-Group and Infra-BFD and setting the existing MPLS LSPs or PWEs to the infra-Group. This does not affect traffic on existing MPLS configurations.

The present disclosure includes creating a group where all the members share the fate if a fault was to occur on the transport underlay. For such a group, an infrastructure member is created that is responsible for detecting and clearing of the fault. The high-frequency BFD session is then run ONLY on that infrastructure connection. The detection and clearance of the fault on the infrastructure connection is processed for all other members in the group, thus avoiding running of BFD sessions on all the members. That is, an infrastructure connection runs one BFD session, and a group of connections do not run BFD sessions, but instead rely on the single BFD session on the infrastructure connection.

PWE and LSP Grouping Process to Achieve Scale in Protection Switching

Figure 1:
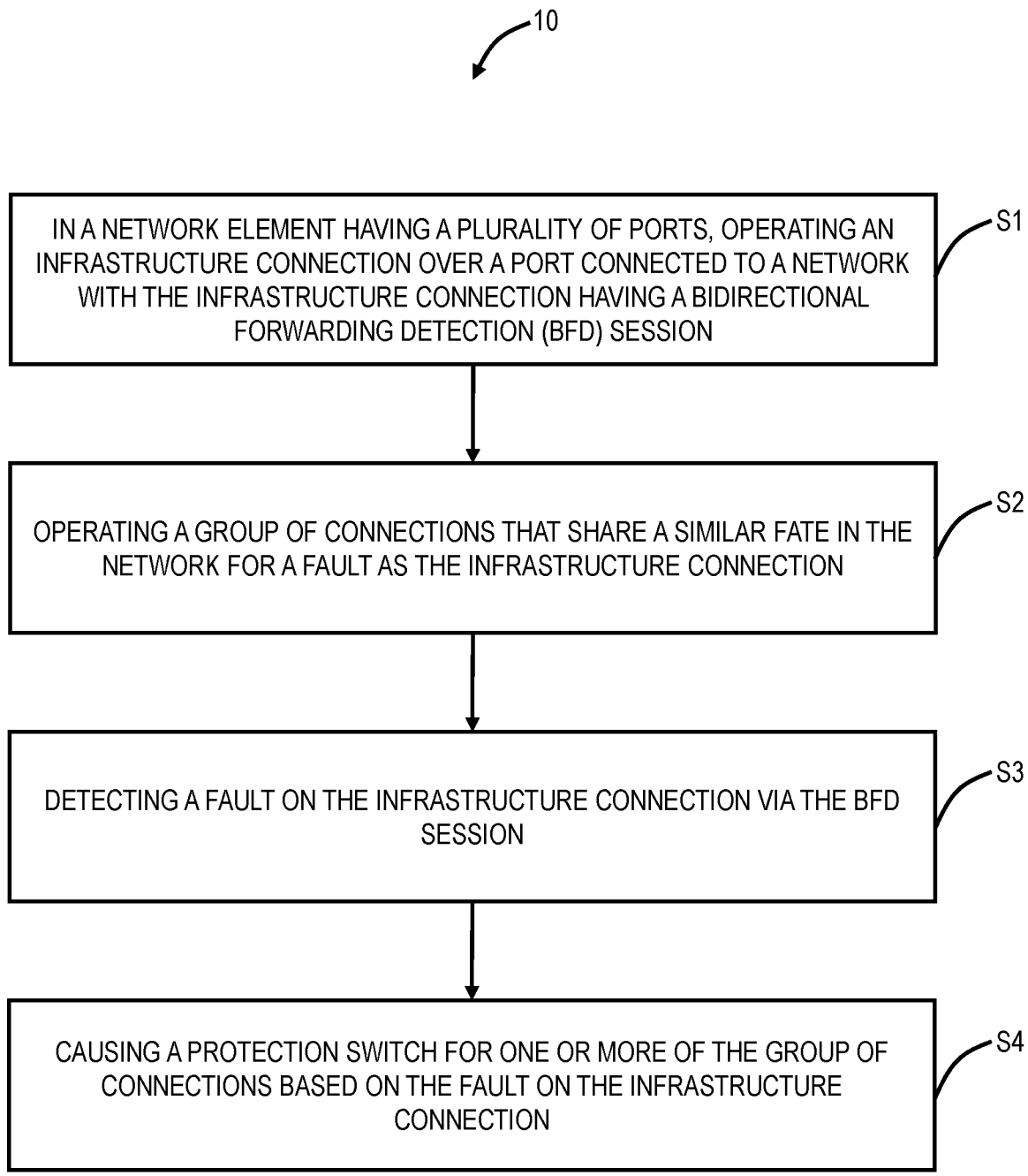
FIG. 1 is a flowchart of a process for Pseudowire (PWE) and Label Switched Path (LSP) grouping to achieve scale in protection switching.

FIG. 1 is a flowchart of a process 10 for Pseudowire (PWE) and Label Switched Path (LSP) grouping to achieve scale in protection switching. The process 10 includes, in a network element having a plurality of ports, operating an infrastructure connection over a port connected to a network with the infrastructure connection having a Bidirectional Forwarding Detection (BFD) session (step S1); operating a group of connections that share a similar fate in the network for a fault as the infrastructure connection (step S2); detecting a fault on the infrastructure connection via the BFD session (step S3); and causing a protection switch for one or more of the group of connections based on the fault on the infrastructure connection (step S4).

In an embodiment, the infrastructure connection and the group of connections can be Pseudowires (PWE). The infrastructure connection and the group of connections can be Multi-Segment Pseudowires (MS-PW) operated over a plurality of protected tunnels, and the fault can be on one of the protected tunnels. Multi-Segment Pseudowires (MS-PW) are described in RFC 6073, "Segmented Pseudowire," January 2011, the contents of which are incorporated by reference herein. Here, the BFD session can be a Virtual Circuit Connectivity Verification (VCCV) BFD session as described in RFC 5885.

In another embodiment, the infrastructure connection and the group of connections can be Label Switched Paths (LSPs) in a Multiprotocol Label Switching (MPLS) network. Here, the BFD session can be an LSP BFD session between Link Edge Routers (LER) as described in RFC 5884.

The BFD session is only operational on the infrastructure connection on behalf of the group of connections. That is, the group of connections do not run a BFD session. Accordingly, service traffic is only operational on the group of connections, and the infrastructure connection is used only for the establishment and operation of the BFD session. The process 10 can further include causing the protection switch by propagating the detected fault on the infrastructure connection to each connection in the group of connections. The process 10 can further include detecting a clearance of the fault on the infrastructure connection and propagate the clearance to each connection in the group of connections.

Pseudowire Example

Figure 2:
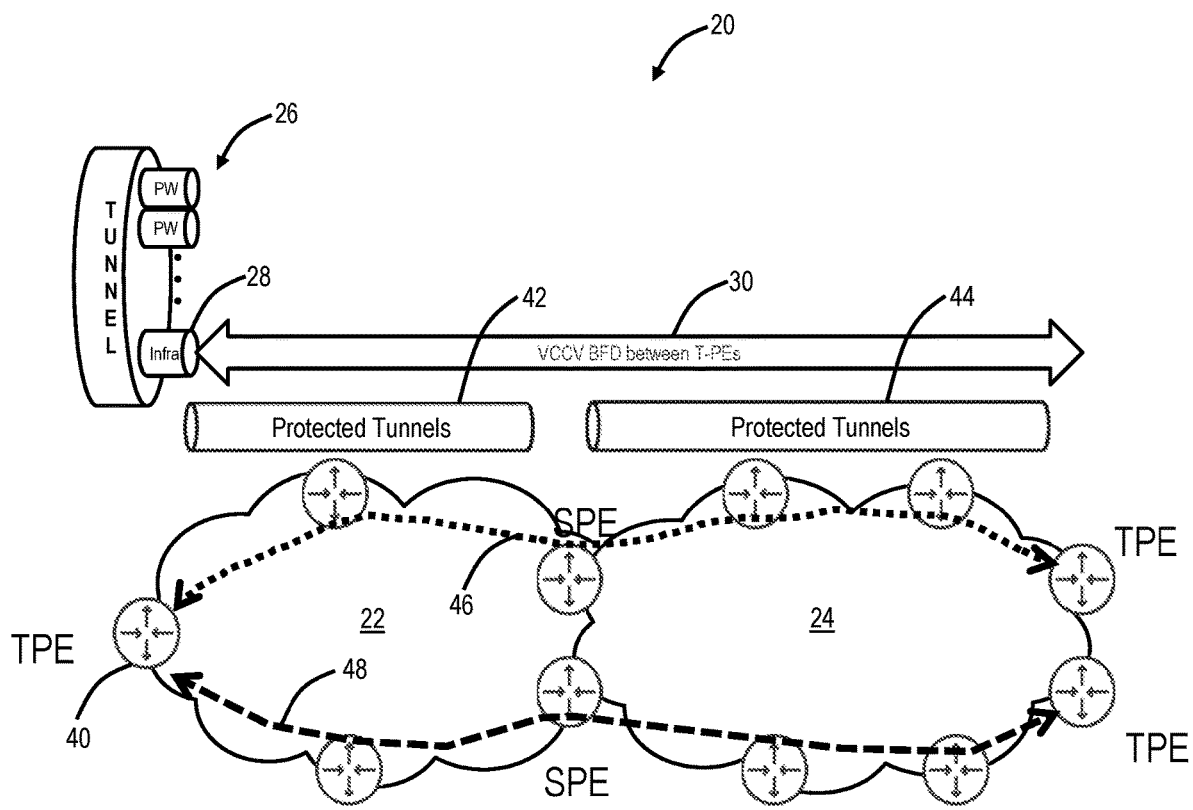
FIG. 2 is a network diagram of a network with two domains and Multi-Segment Pseudowires (MS-PW) connections along with an infrastructure connection operating a VCCV BFD session.
Figure 3:
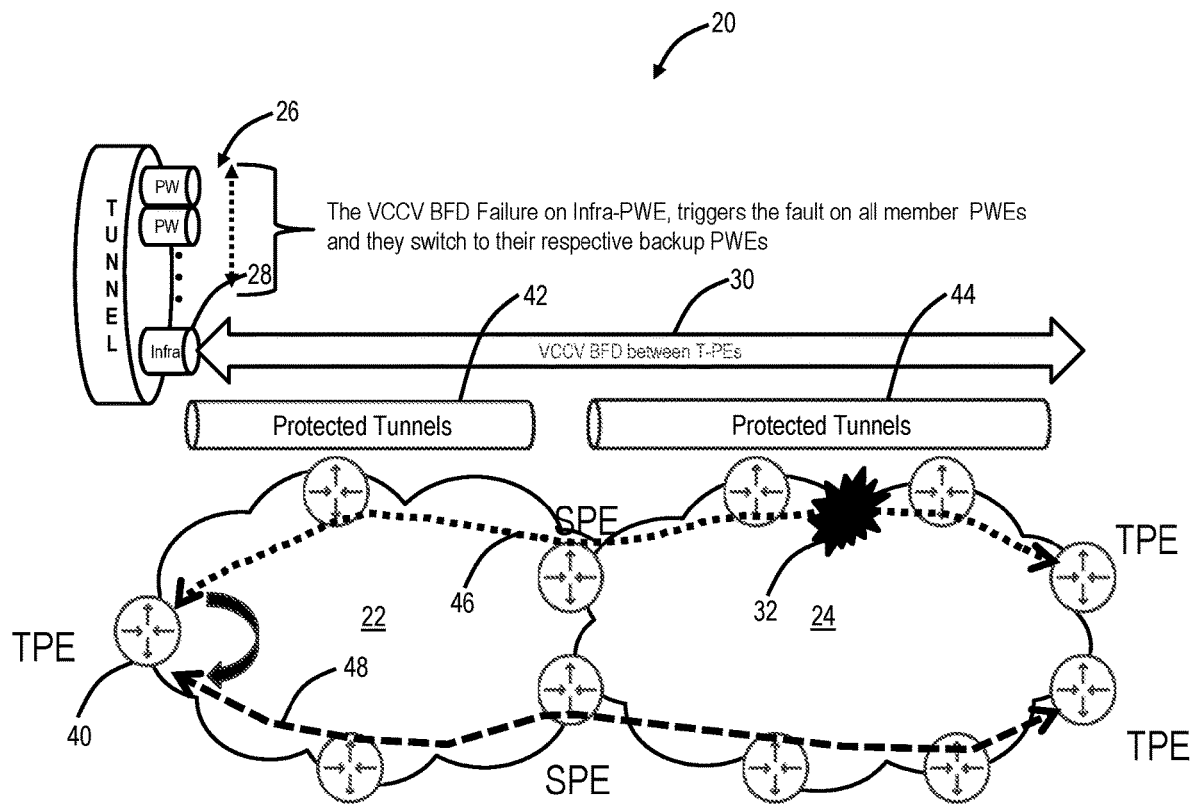
FIG. 3 is a network diagram of the network illustrating a fault detected by the infrastructure connection and corresponding protection switching of the MS-PW connections.

FIG. 2 is a network diagram of a network 20 with two domains 22, 24 and Multi-Segment Pseudowires (MS-PW) connections 26 along with an infrastructure connection 28 operating a VCCV BFD session 30. FIG. 3 is a network diagram of the network 20 illustrating a fault 32 detected by the infrastructure connection 28 and corresponding protection switching of the MS-PW connections 26. The network 20 includes various network elements 40 in the domains 22, 24. The network elements 40 can be Terminating Provider Edge (TPE) routers or Switching Provider Edge (SPE) routers. For example, the SPE routers can be between the domains 22, 24. In this example, there are protected tunnels 42, 44 in each domain 22, 24, respectively. The network 20 includes a primary path 46 and a backup path 48 for MS-PW connections 26 and the infrastructure connection 28. During normal operation (no fault) in FIG. 2, the MS-PW connections 26 operate over the primary path 46.

In FIG. 3, the fault 32 is detected by the infrastructure connection 28 based on the operation of the VCCV BFD session 30. The detection of the fault 32 is solely on the infrastructure connection 28 via the BFD session. That is, the MS-PW connections 26 have no BFD sessions and thus do not detect the fault 32. Instead, the fault detection by the infrastructure connection 28 triggers a fault on all of the MS-PW connections 26, at the TPE network element 40.

Based thereon, the MS-PW connections 26 each switch from the primary path 46 to the backup path 48.

LSP Example

Figure 4:
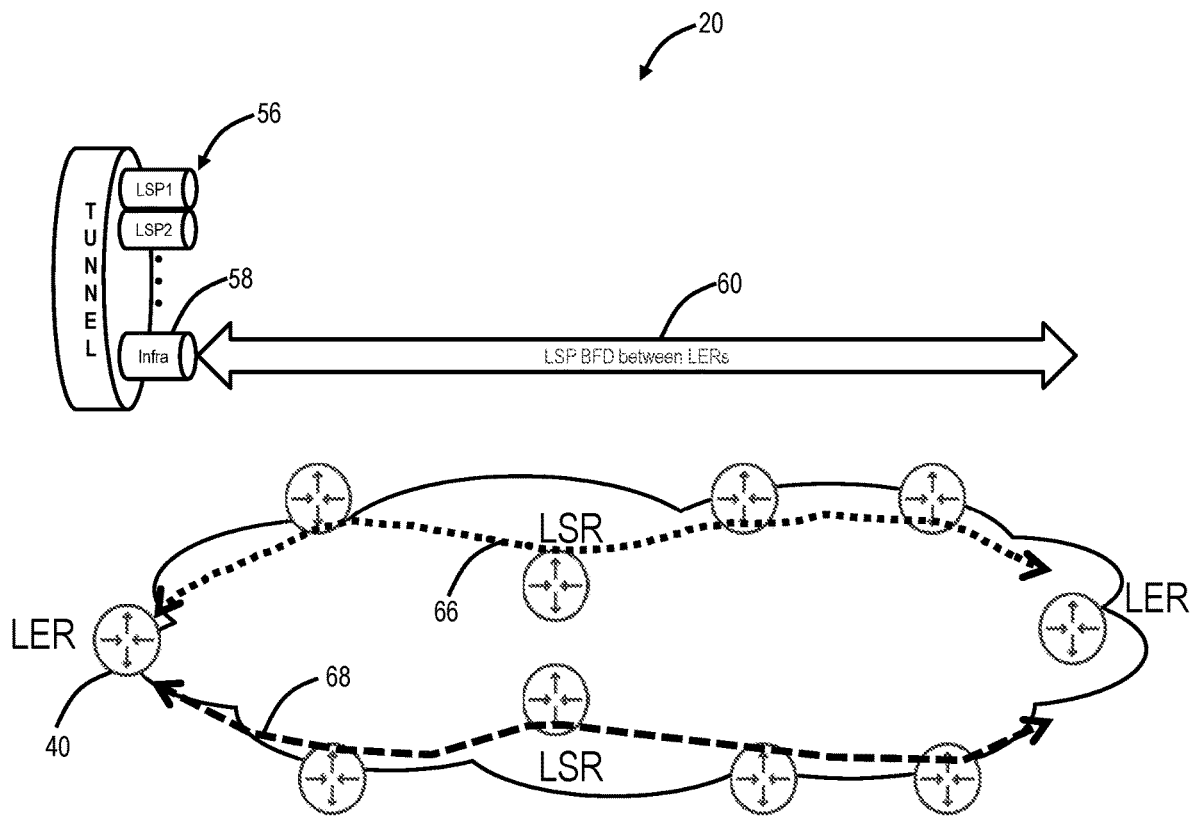
FIG. 4 is a network diagram of a network with Label Switched Paths (LSP) connections along with an infrastructure connection operating an LSP BFD session.
Figure 5:
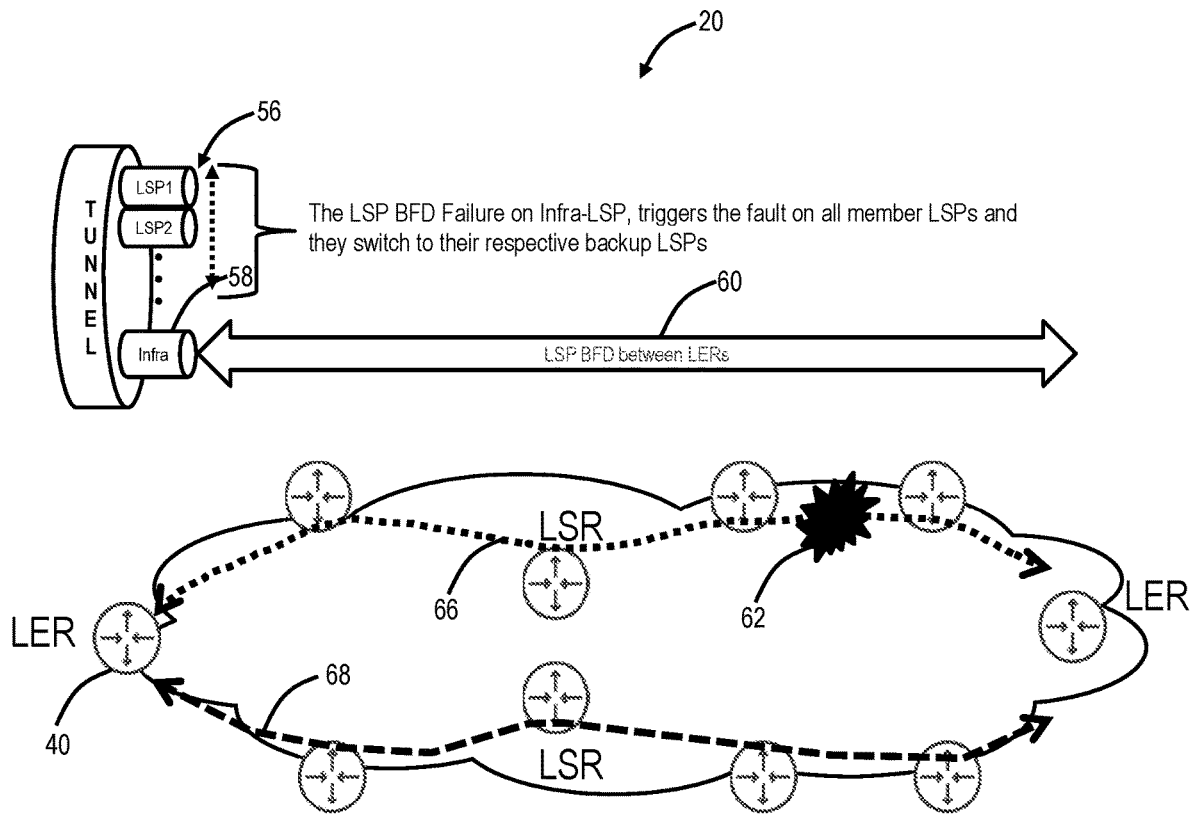
FIG. 5 is a network diagram of the network illustrating a fault detected by the infrastructure connection and corresponding protection switching of the LSP connections.

FIG. 4 is a network diagram of a network 50 with Label Switched Paths (LSP) connections 56 along with an infrastructure connection 58 operating an LSP BFD session 50. FIG. 5 is a network diagram of the network 50 illustrating a fault 62 detected by the infrastructure connection 58 and corresponding protection switching of the LSP connections 56. The network 50 includes various network elements 40. The network elements 40 can be Link Edge Routers (LERs) or Label Switch Routers (LSRs) s. For example, the LSR routers can be intermediate devices between the LERs. The network 50 includes a primary path 66 and a backup path 68 for LSP connections 56 and the infrastructure connection 58. During normal operation (no fault) in FIG. 4, the LSP connections 56 operate over the primary path 66.

In FIG. 5, the fault 62 is detected by the infrastructure connection 78 based on the operation of the LSP BFD session 60. The detection of the fault 62 is solely on the infrastructure connection 58 via the BFD session. That is, the LSP connections 56 have no BFD sessions and thus do not detect the fault 62. Instead, the fault detection by the infrastructure connection 58 triggers a fault on all of the LSP connections 56, at the LER network element 40. Based thereon, the LSP connections 56 each switch from the primary path 66 to the backup path 68.

Network Element

Figure 6:
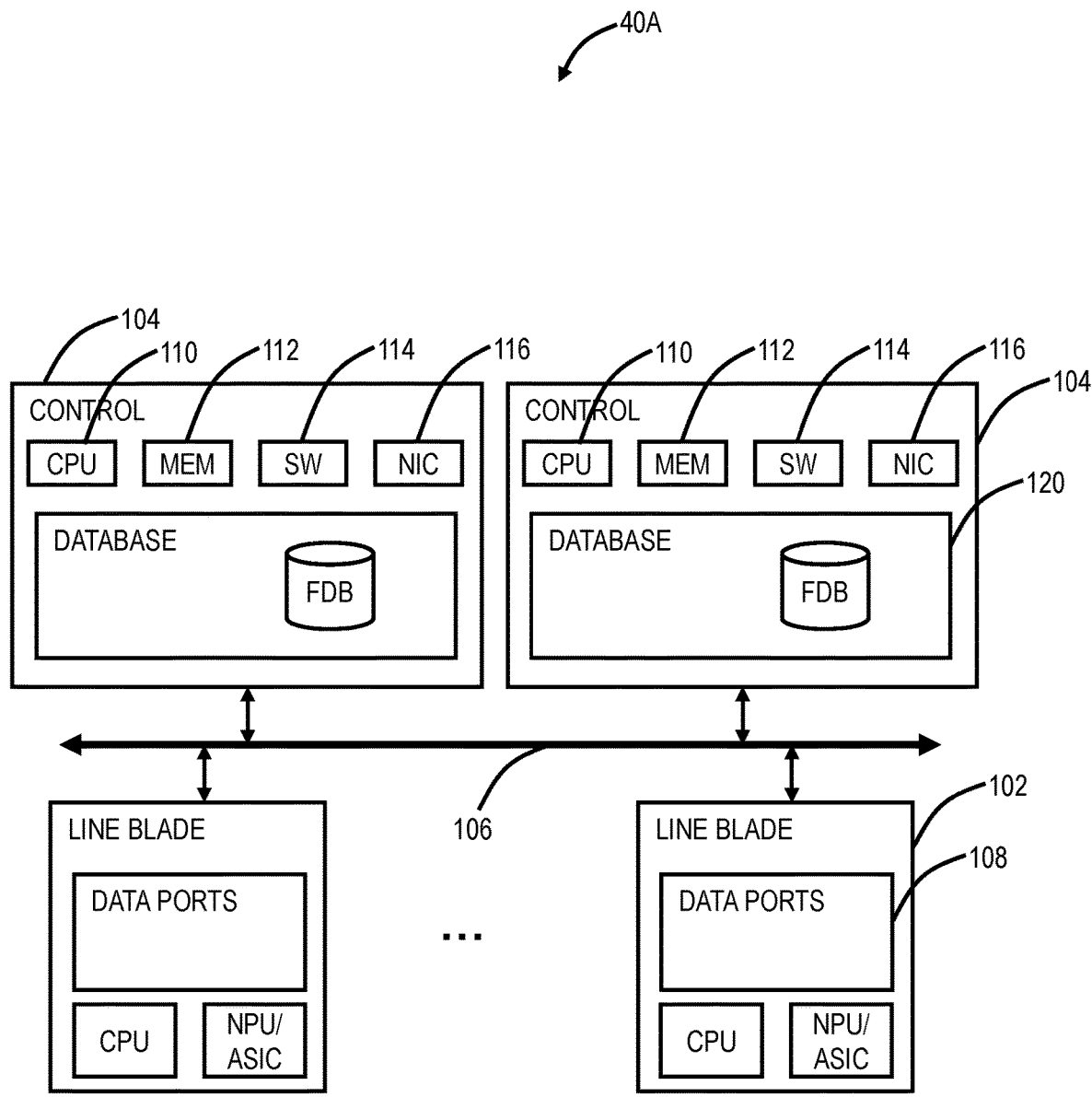
FIG. 6 is a block diagram of an implementation of a network element.

FIG. 6 is a block diagram of an implementation of a network element 40A. In this embodiment, the network element 40A is an Ethernet network switch, but those of ordinary skill in the art will recognize the systems and methods described herein can operate with other types of network elements and other implementations. In this embodiment, the network element 40A includes a plurality of blades 102, 104 interconnected via an interface 106. The blades 102, 104 are also known as line cards, line modules, circuit packs, pluggable modules, etc. and generally refer to components mounted on a chassis, shelf, etc. of a data switching device, i.e., the network element 40A. Each of the blades 102, 104 can include numerous electronic devices and/or optical devices mounted on a circuit board along with various interconnects including interfaces to the chassis, shelf, etc.

Two example blades are illustrated with line blades 102 and control blades 104. The line blades 102 include data ports 108 such as a plurality of Ethernet ports. For example, the line blade 102 can include a plurality of physical ports disposed on an exterior of the blade 102 for receiving ingress/egress connections. Additionally, the line blades 102 can include switching components to form a switching fabric via the interface 106 between all of the data ports 108 allowing data traffic to be switched between the data ports 108 on the various line blades 102. The switching fabric is a combination of hardware, software, firmware, etc. that moves data coming into the network element 40A out by the correct port 108 to the next network element 40A. "Switching fabric" includes switching units in a node; integrated circuits contained in the switching units; and programming that allows switching paths to be controlled. Note, the switching fabric can be distributed on the blades 102, 104, in a separate blade (not shown), integrated on the line blade 102, or a combination thereof. The line blades 102 can include an Ethernet manager (i.e., a processor) and a Network Processor (NP)/Application Specific Integrated Circuit (ASIC).

The control blades 104 include a microprocessor 110, memory 112, software 114, and a network interface 116. Specifically, the microprocessor 110, the memory 112, and the software 114 can collectively control, configure, provision, monitor, etc. the network element 40A. The network interface 116 may be utilized to communicate with an element manager, a network management system, etc. Additionally, the control blades 104 can include a database 120 that tracks and maintains provisioning, configuration, operational data and the like. The database 120 can include a Forwarding Database (FDB) that may be populated as described herein (e.g., via the user triggered approach or the asynchronous approach). In this embodiment, the network element 40A includes two control blades 104 which may operate in a redundant or protected configuration such as 1:1, 1+1, etc.

Figure 7:
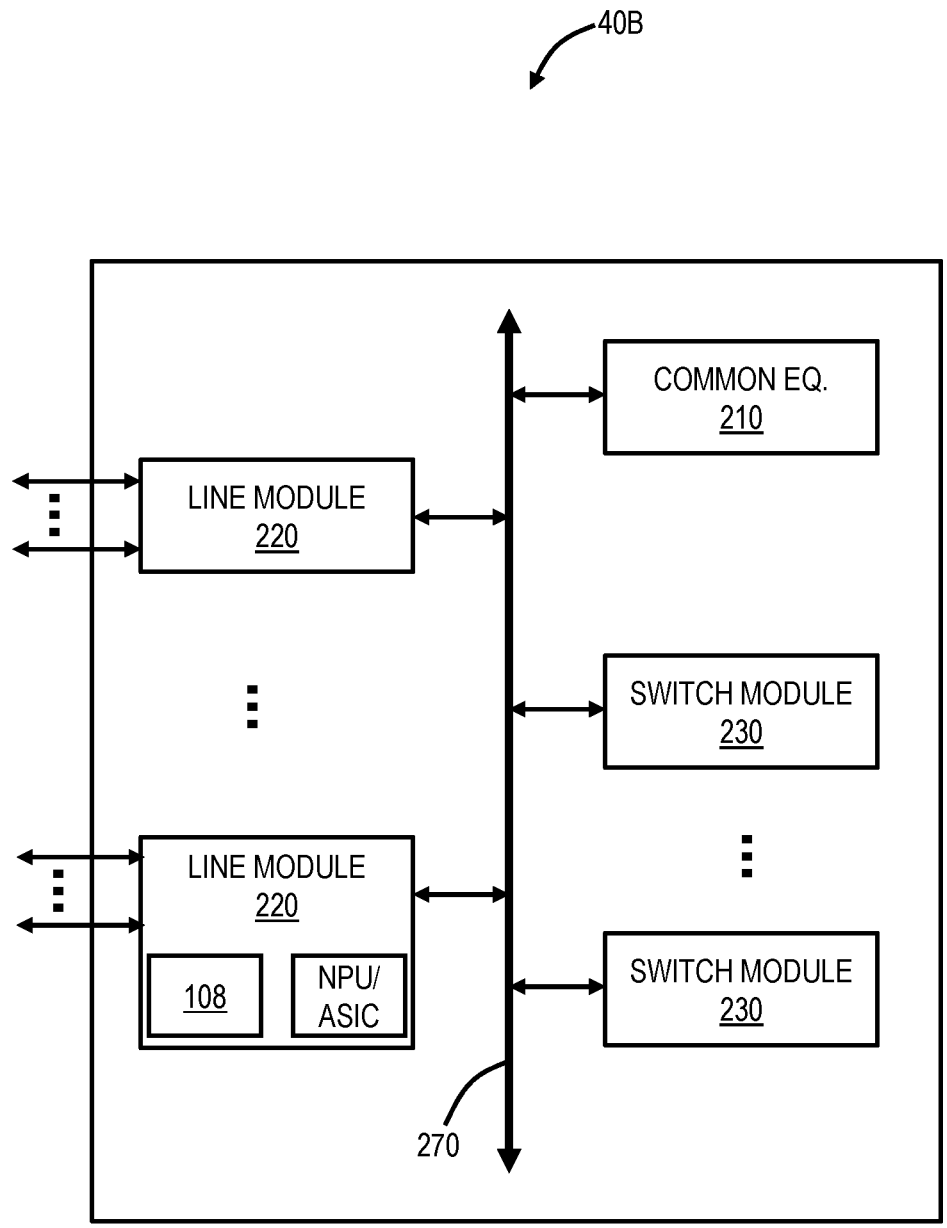
FIG. 7 is a block diagram of another implementation of a network element.

FIG. 7 is a block diagram of another implementation of a network element 40B. For example, the network element 40A can be a dedicated switch whereas the network element 40B can be a multiservice platform. In an embodiment, the network element 40B can be a nodal device that may consolidate the functionality of a multi-service provisioning platform (MSPP), digital cross-connect (DCS), Ethernet and Optical Transport Network (OTN) switch, dense wave division multiplexed (DWDM) platform, etc. into a single, high-capacity intelligent switching system providing Layer 0, 1, and 2 consolidation. In another embodiment, the network element 40B can be any of an add/drop multiplexer (ADM), a multi-service provisioning platform (MSPP), a digital cross-connect (DCS), an optical cross-connect, an optical switch, a router, a switch, a WDM terminal, an access/aggregation device, etc. That is, the network element 40B can be any system with ingress and egress signals and switching of packets, channels, timeslots, tributary units, wavelengths, etc.

In an embodiment, the network element 40B includes common equipment 210, one or more line modules 220, and one or more switch modules 230. The common equipment 210 can include power; a control module; Operations, Administration, Maintenance, and Provisioning (OAM&P) access; and the like. The common equipment 210 can connect to a management system such as a Network Management System (NMS), an Element Management System (EMS), or the like. The network element 40B can include an interface 270 for communicatively coupling the common equipment 210, the line modules 220, and the switch modules 230 together. For example, the interface 270 can be a backplane, midplane, a bus, optical or electrical connectors, or the like. The line modules 220 are configured to provide ingress and egress to the switch modules 230 and external to the network element 40B. In an embodiment, the line modules 220 can form ingress and egress switches with the switch modules 230 as center stage switches for a three-stage switch.

The line modules 220 can include a plurality of connections per module and each module may include a flexible rate and protocol support for any type of connection, such as, for example, 155 Mb/s, 622 Mb/s, 1 Gb/s, 2.5 Gb/s, 10 Gb/s, 40 Gb/s, 100 Gb/s, etc. The line modules 220 can include wavelength division multiplexing interfaces, short reach interfaces, and the like, and can connect to other line modules 220 on remote network elements, end clients, routers, switches, and the like. From a logical perspective, the line modules 220 provide ingress and egress ports to the network element 40B, and each line module 220 can include one or more physical ports. The switch modules 230 are configured to switch channels, timeslots, tributary units, wavelengths, etc. between the line modules 220. For example, the switch modules 230 can provide wavelength granularity (Layer 0 switching), SONET/SDH granularity; OTN granularity such as Optical Channel Data Unit-k (ODUk) Optical Channel Data Unit-flex (ODUflex), etc.; Ethernet granularity; and the like. Specifically, the switch modules 230 can include both Time Division Multiplexed (TDM) (i.e., circuit switching) and packet switching engines. The switch modules 230 can include redundancy as well, such as 1:1, 1:N, etc.

In context of the systems and methods described herein, the network element 40A includes packet switching and Ethernet functionality which can be implemented in circuitry and located on the line blade 102, the control blade 104, in the switching fabric at some point, etc. Similar to the network element 40A, the network element 40B includes packet switching and Ethernet functionality through the line modules 220 and/or the switch modules 230. The network element 40B includes packet switching and Ethernet functionality implemented in circuitry and located on the line modules 220, the switch modules 230, the common equipment 210, etc. Specifically, the process 10 can be implemented in circuitry, logic, hardware, firmware, software, and/or a combination thereof in part in the network elements 40. Those of ordinary skill in the art will recognize the network elements 40 can include other components that are omitted for illustration purposes, and that the systems and methods described herein contemplate using a plurality of different nodes with the network elements 40 presented as an example type of node. For example, in another embodiment, a node may not include the switch modules 230, but rather have the corresponding functionality in the line modules 220 (or some equivalent) in a distributed fashion. In a further embodiment, a network element may be an integrated device without a blade, line modules, etc., i.e., a so-called pizza box. For the network elements 40, other architectures providing ingress, egress, and switching are also contemplated for the systems and methods described herein.

In an embodiment, a network element 40 includes a plurality of ports 108 interconnected by a switching fabric, wherein a port 108 includes a plurality of connections including an infrastructure connection that operates a Bidirectional Forwarding Detection (BFD) session and a group of connections that share a similar fate for a fault as the infrastructure connection; and a controller 300 configured to detect a fault on the infrastructure connection via the BFD session, and cause a protection switch for one or more of the group of connections based on the fault on the infrastructure connection. The infrastructure connection and the group of connections can be Pseudowires (PWE). The infrastructure connection and the group of connections can be Multi-Segment Pseudowires (MS-PW) operated over a plurality of protected tunnels, and wherein the fault is on one of the protected tunnels.

The infrastructure connection and the group of connections can be Label Switched Paths (LSPs) in a Multiprotocol Label Switching (MPLS) network. The BFD session can be only operational on the infrastructure connection on behalf of the group of connections. Service traffic can be only operational on the group of connections, and the infrastructure connection is used only for the establishment and operation of the BFD session. The controller can be configured to cause the protection switch by propagating the detected fault on the infrastructure connection to each connection in the group of connections. The controller can be configured to detect clearance of the fault on the infrastructure connection and propagate the clearance to each connection in the group of connections.

With respect to the network element 40, for PWE configurations, e.g., the PWE Command Line Interface (CLI) or NMS GUI would allow a special PWE with a flag INFRA PWE to be created and assigned to a PWE Group. The normal service PWE CLI's would provide an option to attach the PWE to a Group. Once a member of a Group, these PWEs would be monitored by the Infra-PWE. The individual PWEs would not be allowed to have their individual VCCV BFD. A similar approach could be used for LSP configurations.

Controller

Figure 8:
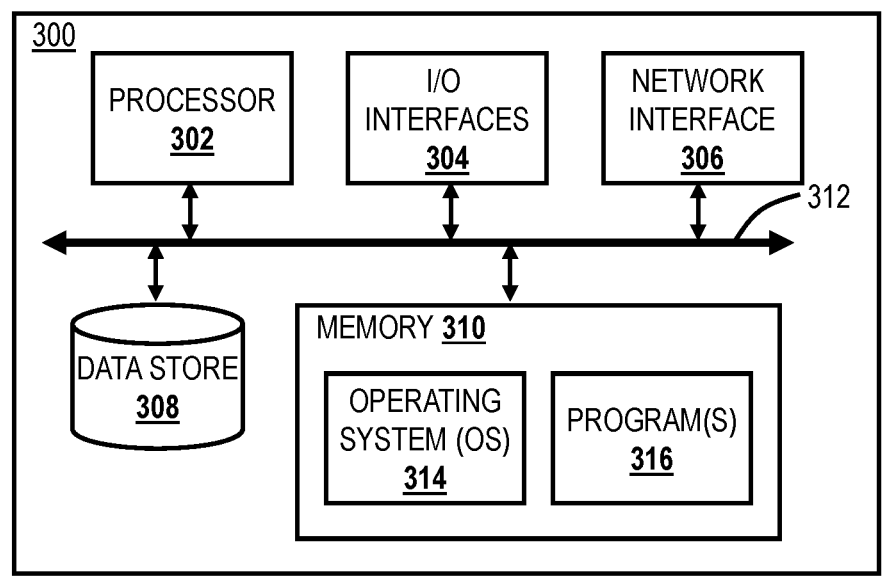
FIG. 8 is a block diagram of a controller which may be used in the network element of FIGS. 6-7.

FIG. 8 is a block diagram of a controller 300 which may be used in the network element 40. The controller 300 may be a digital computer that, in terms of hardware architecture, generally includes a processor 302, input/output (I/O) interfaces 304, a network interface 306, a data store 308, and memory 310. It should be appreciated by those of ordinary skill in the art that FIG. 8 depicts the controller 300 in an oversimplified manner, and a practical embodiment may include additional components and suitably configured processing logic to support known or conventional operating features that are not described in detail herein. The components (302, 304, 306, 308, and 310) are communicatively coupled via a local interface 312. The local interface 312 may be, for example, but not limited to, one or more buses or other wired or wireless connections, as is known in the art. The local interface 312 may have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 may be any custom made or commercially available processor, a central processing unit (CPU), an auxiliary processor among several processors associated with the controller 300, a semiconductor-based microprocessor (in the form of a microchip or chip set), or generally any device for executing software instructions. When the controller 300 is in operation, the processor 302 is configured to execute software stored within the memory 310, to communicate data to and from the memory 310, and to generally control operations of the controller 300 pursuant to the software instructions. The I/O interfaces 304 may be used to receive user input from and/or for providing system output to one or more devices or components.

The network interface 306 may be used to enable the controller 300 to communicate over a network, and the like, etc. The network interface 306 may include address, control, and/or data connections to enable appropriate communications on the network. A data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media.

The memory 310 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 310 may incorporate electronic, magnetic, optical, and/or other types of storage media. Note that the memory 310 may have a distributed architecture, where various components are situated remotely from one another but can be accessed by the processor 302. The software in memory 310 may include one or more software programs, each of which includes an ordered listing of executable instructions for implementing logical functions. The software in the memory 310 includes a suitable operating system (O/S) 314 and one or more programs 316. The operating system 314 essentially controls the execution of other computer programs, such as the one or more programs 316, and provides scheduling, input-output control, file and data management, memory management, and communication control and related services. The one or more programs 316 may be configured to implement the various processes, algorithms, methods, techniques, etc. described herein.

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A network element comprising:
a plurality of ports interconnected by a switching fabric, wherein a port includes a plurality of connections including an infrastructure connection that operates a Bidirectional Forwarding Detection (BFD) session, that is a Virtual Circuit Connectivity Verification (VCCV) BFD session, configured on behalf of a group of connections that share a similar fate for a fault as the infrastructure connection, wherein the group of connections do not have their own BFD sessions, wherein the infrastructure connection does not carry service traffic, and wherein the infrastructure connection and the group of connections originate and terminate on same Provider Edge (PE) routers; and
a controller configured to
detect a fault on the infrastructure connection via the BFD session, and
cause a protection switch for one or more of the group of connections based on the fault on the infrastructure connection.

2. The network element of claim 1, wherein the infrastructure connection and the group of connections are Pseudowires (PWE).

3. The network element of claim 1, wherein the infrastructure connection and the group of connections are Multi-Segment Pseudowires (MS-PW) operated over a plurality of protected tunnels, and wherein the fault is on one segment.

4. The network element of claim 1, wherein the infrastructure connection and the group of connections are Label Switched Paths (LSPs) in a Multiprotocol Label Switching (MPLS) network.

5. The network element of claim 1, wherein the BFD session is only operational on the infrastructure connection on behalf of the group of connections.

6. The network element of claim 1, wherein service traffic is only operational on the group of connections and the infrastructure connection is used only for establishment and operation of the BFD session.

7. The network element of claim 1, wherein the controller is configured to cause the protection switch by propagating the detected fault on the infrastructure connection to each connection in the group of connections.

8. The network element of claim 1, wherein the controller is configured to
detect a clearance of the fault on the infrastructure connection and propagate the clearance to each connection in the group of connections.

9. A method comprising:
in a network element having a plurality of ports, operating an infrastructure connection over a port connected to a network with the infrastructure connection having a Bidirectional Forwarding Detection (BFD) session that is a Virtual Circuit Connectivity Verification (VCCV) BFD session, wherein the infrastructure connection is configured on behalf of a group of connections, wherein the infrastructure connection does not carry service traffic, and wherein the infrastructure connection and the group of connections originate and terminate on same Provider Edge (PE) routers;

operating the group of connections that share a similar fate in the network for a fault as the infrastructure connection, wherein the group of connections do not have their own BFD sessions;

detecting a fault on the infrastructure connection via the BFD session; and causing a protection switch for one or more of the group of connections based on the fault on the infrastructure connection.

10. The method of claim 9, wherein the infrastructure connection and the group of connections are Pseudowires (PWE).

11. The method of claim 9, wherein the infrastructure connection and the group of connections are Multi-Segment Pseudowires (MS-PW) operated over a plurality of protected tunnels, and wherein the fault is on one segment.

12. The method of claim 9, wherein the infrastructure connection and the group of connections are Label Switched Paths (LSPs) in a Multiprotocol Label Switching (MPLS) network.

13. The method of claim 9, wherein the BFD session is only operational on the infrastructure connection on behalf of the group of connections.

14. The method of claim 9, wherein service traffic is only operational on the group of connections and the infrastructure connection is used only for establishment and operation of the BFD session.

15. The method of claim 9, further comprising
causing the protection switch by propagating the detected fault on the infrastructure connection to each connection in the group of connections.

16. The method of claim 9, further comprising
detecting a clearance of the fault on the infrastructure connection and propagate the clearance to each connection in the group of connections.

17. A non-transitory computer-readable medium with instructions executable by a network element that, in response to such execution, cause the network element to perform the steps of:

operating an infrastructure connection over a port connected to a network with the infrastructure connection having a Bidirectional Forwarding Detection (BFD) session that is a Virtual Circuit Connectivity Verification (VCCV) BFD session, wherein the infrastructure connection is configured on behalf of a group of connections, wherein the infrastructure connection does not carry service traffic, and wherein the infrastructure connection and the group of connections originate and terminate on same Provider Edge (PE) routers;

operating the group of connections that share a similar fate in the network for a fault as the infrastructure connection, wherein the group of connections do not have their own BFD sessions;

detecting a fault on the infrastructure connection via the BFD session; and causing a protection switch for one or more of the group of connections based on the fault on the infrastructure connection.

18. The non-transitory computer-readable medium of claim 17, wherein the infrastructure connection and the group of connections are Pseudowires (PWE).

19. The non-transitory computer-readable medium of claim 17, wherein the infrastructure connection and the group of connections are Label Switched Paths (LSPs) in a Multiprotocol Label Switching (MPLS) network.

20. The non-transitory computer-readable medium of claim 17, wherein the BFD session is only operational on the infrastructure connection on behalf of the group of connections.

* * * * *